June 27, 1961 R. BRAUNSTEIN 2,990,518

NUCLEAR QUADRUPOLE RESONANCE DEVICES

Filed May 29, 1957

INVENTOR.
RUBIN BRAUNSTEIN
BY J. L. Whittaker
ATTORNEY

United States Patent Office 2,990,518 Patented June 27, 1961

2,990,518

NUCLEAR QUADRUPOLE RESONANCE DEVICES

Rubin Braunstein, Princeton, N.J., assignor to Radio Corporation of America, a corporation of Delaware Filed May 29, 1957, Ser. No. 662,429
20 Claims. (Cl. 331—94)

Figure 1:
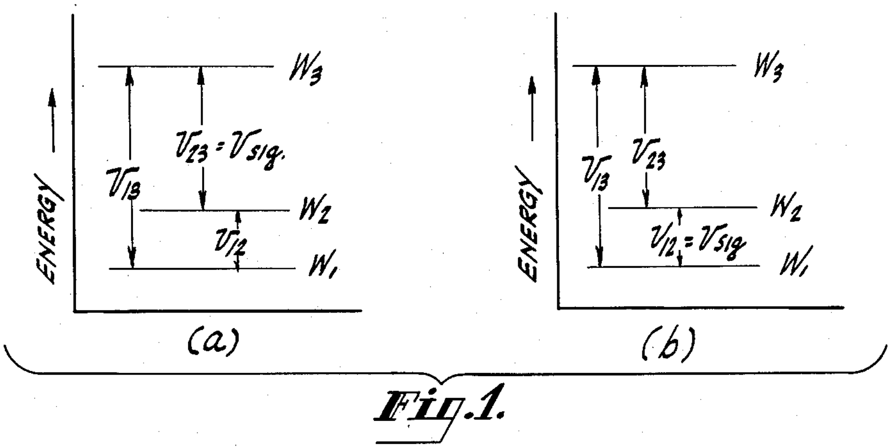

This invention relates generally to the amplification, generation, or frequency conversion of electrical energy. Particularly the invention is directed to improved devices for performing the above functions by means of atomic or molecular rather than electronic processes.

In many familiar microwave devices such as klystrons, magnetrons, and traveling-wave tubes, direct-current power is converted to microwave power by the interaction of moving charged particles (electrons) with a microwave field. This group of devices may be used for many purposes including the amplification and generation of microwave energy.

However, there now exists another class of devices which may be used to perform like functions. This class of devices utilizes the interaction of a microwave field with uncharged matter such as atoms or molecules of resonant substances. In such an interaction there is no flow of energy resulting from kinetic or positional energy being transformed to radio-frequency energy, but instead the internal energy of the atoms or molecules is directly converted into microwave energy.

In the latter class of devices the atoms or molecules in certain discrete quantum energy states (a term used interchangeably with energy levels) normally are in a condition of thermal equilibrium. This means that the atoms or molecules assume a Boltzmann distribution, i.e., there are greater numbers of atoms or molecules in lower energy states than in higher energy states. In thermal equilibrium the atoms or molecules may be said to exhibit positive attenuation and absorb energy at frequencies equal to the energy difference between the discrete energy levels of interest divided by Planck's constant. A field is then applied to interact with the atoms or molecules to disturb the thermal equilibrium condition. Application of the field induces transitions between the higher and lower energy states with the result that Boltzmann distribution is inverted. In such case there is a greater number of atoms or molecules in higher energy states than in lower energy states. In the non-thermal equilibrium condition the atoms or molecules may be said to exhibit negative attenuation and, in returning to thermal equilibrium, emit rather than absorb energy at the frequencies involved. The resonant substance thus may be placed within a hollow wave energy structure and used for the amplification, generation, or frequency conversion of electrical energy.

A number of arangements heretofore have been proposed for utilizing resonant materials not in thermal equilibrium for the purposes described above. Some of these arrangements employ induced transitions between two discrete energy levels while others use induced transitions among three discrete energy levels. Various such arrangements are described in a survey article by J. P. Wittke, entitled "Molecular Amplification and Generation of Microwaves," which appears at pages 291–316 of the March 1957 Proceedings of the Institute of Radio Engineers. Some of the devices referred to in the article employ only resonant gases which exhibit rather low intensity emissive effects. Other of the devices are complicated and cumbersome in that long beam tubes are required, and still other arangements require applied magnetic fields and employ relatively lossy paramagnetic materials.

An object of the instant invention is to provide improved means for translating the internal energy of atoms or molecules into useful electrical energy.

Another object of the invention is to provide improved apparatus for employing atomic or molecular processes for the amplification, generation, or frequency conversion of electrical energy.

A further object of the invention is to provide a simpler and more efficient means for using materials not in thermal equilibrium for amplifying or generating electrical energy.

A still further object of the invention is to provide devices of the type referred to above which are characterized by a low noise figure.

The foregoing and other objects and advantages are achieved in accordance with the invention by employing a material, preferably a solid, which as a result of a nuclear quadrupole interaction exhibits at least three discrete energy states or levels. It should be noted that an external unidirectional magnetic field is not required for the observation of the discrete energy levels. A radio-frequency field is applied to the material at a first frequency determined by two of the aforesaid three energy levels to excite the material to a non-thermal equilibrium distribution of energy states to produce stimulated emission at a second frequency determined by one of the two energy levels and the remaining one of the three levels. This radiation energy or stimulated emission may be utilized to afford either generation or amplification of electrical energy at the second frequency.

Figure 2:
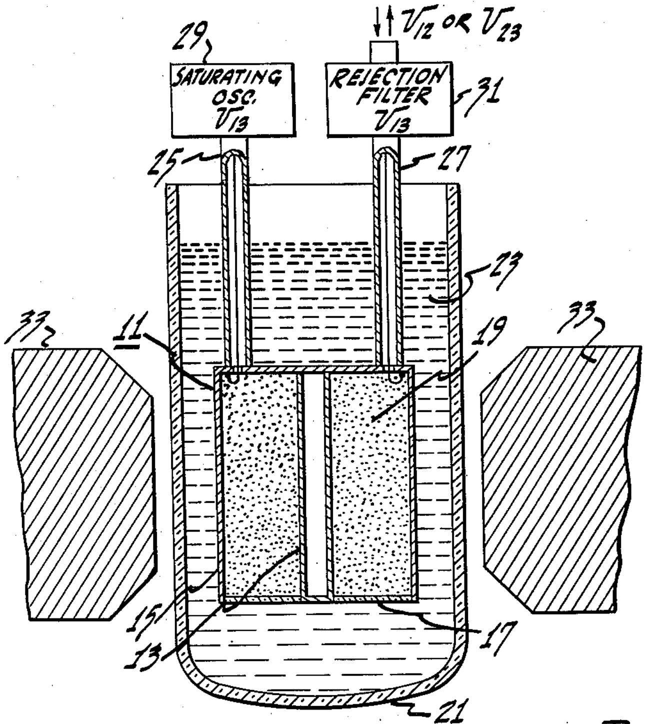

The invention will be described in greater detail with reference to the accompanying drawings in which:

FIGURES 1(*a*) and 1(*b*) are energy level diagrams useful in explaining the theory of operation of the invention; and FIGURE 2 is a typical embodiment of the invention which may be employed either for the amplification or generation of electrical energy.

*Theory of operation*

It has been found that materials which exhibit nuclear quadrupole resonance possess properties which may be used to advantage in the production of stimulated emission of radiation. Quadrupole resonance is defined as a resonance in which transitions between energy levels occur in a material due to interaction between a quadrupole moment and a gradient of electric field. In such materials the nuclear quadrupole moment couples to an internal electric field gradient to provide a system of at least three discrete quantum energy levels. Three discrete levels are provided when the nuclear spin is $I=5/2$ and four levels are provided with a nuclear spin of $I=7/2$. The three energy level system is illustrated in FIGURE 1 with $W_1$, $W_2$, and $W_3$ being the energy levels of interest where, in the case of thermal equilibrium, the number of atoms or molecules in level $W_1$ is greater than the number of atoms or molecules in level $W_2$ and the number of atoms or molecules in level $W_2$ is greater than the number of atoms or molecules in level $W_3$. With the population distributions in the various energy levels as described, the material may be said to be in a condition of thermal equilibrium and exhibit positive attenuation. In such condition the material absorbs rather than emits electrical energy incident thereon at frequencies determined by the energy levels exhibited.

Ordinarily energy level transitions are permitted to occur only between adjacent energy levels, i.e., between levels $W_1$ and $W_2$ and between $W_2$ and $W_3$. This is the case where the internal electric field has pure axial symmetry and the selection rule $\Delta|m|=1$ applies. However, energy level transitions may be induced in which $\Delta|m|=2$ where the internal electric field deviates from axial symmetry. And, the greater the deviation from axial symmetry the greater the probability of $\Delta|m|=2$ transitions.

Under these circumstances a "saturating" radio-frequency field at a frequency $\nu_{13}$ determined by the difference between energy levels $W_1$ and $W_3$ may be applied to the material to induce energy level transitions between levels $W_1$ and $W_3$. Application of the saturating field to the material disturbs the thermal equilibrium population condition referred to above with the result that levels $W_1$ and $W_3$ become equally populated. In such case the material may be said to exhibit negative attenuation and, depending upon the relative strengths of the relaxation mechanisms for returning energy levels $W_1$ and $W_2$ and energy levels $W_2$ and $W_3$ to thermal equilibrium, stimulated or induced emission (electromagnetic radiation energy) is produced by the resonant material at a frequency $\nu_{12}$ determined by the difference between energy levels $W_1$ and $W_2$ or at a frequency $\nu_{23}$ determined by the difference betwen energy levels $W_2$ and $W_3$.

FIGURE 1(*a*) illustrates a situation in which there is a strong relaxation mechanism between levels $W_1$ and $W_2$ and a weak relaxation mechanism between levels $W_2$ and $W_3$. In this case the number of atoms or molecules in level $W_3$ is greater than the number of atoms or molecules in level $W_2$ and radiation signal energy is produced at the frequency $\nu_{23}$. FIGURE 1(*b*) illustrates the converse situation in which there is a weak relaxation mechanism between levels $W_1$ and $W_2$ and a strong relaxation mechanism between levels $W_2$ and $W_3$. Here the number of atoms or molecules in level $W_2$ is greater than the number of atoms or molecules in level $W_1$ and radiation signal energy, stimulated emission, is produced at frequency $\nu_2$.

The stimulated emission of signal energy at one of the frequencies $\nu_{12}$ and $\nu_{23}$ may be utilized in the manner described below either for the amplification or generation of electrical energy.

*Structure*

Referring to FIGURE 2, a cavity resonator 11 is provided which is resonant at one of the frequencies $\nu_{12}$ or $\nu_{23}$ and also is resonant at the frequency $\nu_{13}$. The resonator illustrated is one-quarter wavelength long at the operating frequency and is of the coaxial type closed at one end having an inner conductor 13 and an outer conductor 15 concentric with an inner conductor 13. The spacing between the inner and outer conductors 13 and 15 at the open end of the resonator may be maintained by any convenient insulating means such as a Teflon (polytetrafluoroethylene) ring 17. The resonator 13 is dimensioned to be resonant at the fundamental or first harmonic of the signal frequency to be amplified or generated, say the frequency $\nu_{12}$, and also resonant at the third harmonic of the frequency $\nu_{12}$. The third harmonic of the frequency $\nu_{12}$, to a first approximation, is approximately equal to the frequency $\nu_{13}$.

Other designs of cavity resonators may be employed in accordance with the invention although the coaxial type is preferable for operation in the 200 megacycle per second to 1,000 magacycle per second frequency range. At higher frequencies the cylindrical type resonator may be used to greater advantage.

The material 19 contained within the resonator 11 is a material which as a result of the nuclear quadrupole interaction referred to previously exhibits at least three discrete energy levels. The material 19 may comprise gases such as iodine monochloride (ICl), iodine cyanide (ICN), rhenium trioxychloride ($ReO_3Cl$) or solids such as iodine ($I_2$), iodine monochloride (ICl), iodine cyanide (ICN), or iodic acid ($HIO_3$). It is preferred, however, that the material selected be a solid in order that a large number of atoms or molecules per unit volume are available to contribute to the radiation energy or induced stimulated emission.

Since the above class of materials has extremely low dielectric losses compared to other materials, for example, those which exhibit paramagnetic resonance, the material 19 may completely fill the resonator 11. This is not essential however and in certain instances such as where the resonator is capacitively loaded the material 19 may be placed therein only in the region or regions of high magnetic field concentration.

The resonator 11 filled with the material 19 may be immersed in a vessel 21 containing a coolant 23 such as liquid nitrogen. Electrical connection to the resonator 11 is made by means of coaxial conductors 25 and 27.

In operation, a "saturating" oscillator 29 generates electrical energy at the frequency $\nu_{13}$ which is applied to the resonator 11 via the coaxial conductor 25 to excite atoms or molecules of the material 19 so that energy level transitions are induced to equalize the populations of energy levels $W_1$ and $W_3$. The power output of the oscillator 29 may be of the order of milliwatts and the operating frequency of the oscillator, assuming that $HIO_3$ is the material used, may be 528.746 megacycles per second. For operation at UHF frequencies the oscillator 29 may be any one of a number of known UHF oscillators. For higher frequency operation the oscillator 29 may be a magnetron or a klystron. With the population condition disturbed in the above manner atoms or molecules of the material radiate electromagnetic energy (stimulated emission) at the frequency $\nu_{12}$. For the material $HIO_3$ the frequency $\nu_{12}$ is 202.871 megacycles per second, and this is one of the frequencies for which the resonator is resonant.

With the intensity of the stimulated emission or radiation sufficient to exceed the usual cavity resonator losses, the overall attenuation of the structure is negative and the structure may be used to amplify or generate electrical energy at the frequency $\nu_{12}$.

Amplification occurs where the input energy to be amplified results in stimulated emission sufficient to overcome the unloaded losses of the cavity resonator, i.e., the losses exclusive of magnetic losses or gains in the material 19. The input energy to be amplified is applied to the resonator 11 by means of the coaxial conductor 27 and, after amplification in the resonator, the amplified input energy may be coupled from the resonator by the same conductor 27. A rejection filter 31 is provided which passes the energy applied to and withdrawn from the resonator at frequency $\nu_{12}$ and rejects the saturating energy at frequency $\nu_{13}$. In some cases it may be undesirable to use a single coupling means for applying input energy to the resonator and withdrawing amplified input energy therefrom. In such instances an additional coupling means may be employed.

Generation rather than amplification of electrical energy at frequency $\nu_{12}$ occurs where the stimulated emission is sufficient to overcome the loaded losses of the cavity resonator. In this instance the oscillatory energy at the frequency $\nu_{12}$ may be coupled from the resonator by the same conductor 27 and applied to a desired utilization circuit. The rejection filter 31 again is desired to prevent the saturating frequency $\nu_{13}$ from appearing in the oscillator output.

It will be noted that previously it was mentioned that the second cavity resonance is at the third harmonic of the frequency $\nu_{12}$, and that to a first approximation the third harmonic is approximately equal to $\nu_{13}$. In the example cited ($HIO_3$) it will be further noted that $\nu_{13}$ (528.746 mc./sec.) is less than three times $\nu_{12}$ (202.871 mc./sec.). This is because the ratio of frequency $\nu_{13}$ to frequency $\nu_{12}$ decreases with increased deviation of the internal electric field from axial symmetry. The deviation from axial symmetry however makes possible the $\Delta|m|=2$ transitions and the greater the deviation the greater the probability is that such transitions occur. The fact that the cavity resonator 11 is not exactly on resonance at the frequency $\nu_{13}$ is not a problem, however, since this factor may be compensated for by increasing the strength of the saturating field produced by the oscillator 29.

Although the above description has been directed to the amplification or generation of electrical energy at frequency $\nu_{12}$, for materials having appropriate relaxation mechanisms the system also may operate to amplify and generate energy at the frequency $\nu_{23}$.

The cooling arrangement heretofore mentioned may be used in cases where low noise and proper relaxation times are a consideration. Where an even greater measure of cooling is required a double walled Dewar may be used instead of the simple vessel 21. In such case liquid nitrogen may be contained between the double walls of the Dewar and liquid helium contained within the inner wall of the Dewar.

In situations where the material 19 constitutes a gas or a single crystal type of solid, an external magnetic field may be applied to the material 19, as by pole pieces of a permanent magnet 33, to control the separation between the energy levels $W_1$, $W_2$, and $W_3$. In such case variation of the strength of the applied magnetic field tunes the frequency at which the structure amplifies or generates energy. By way of example this field may be varied without difficulty between zero and ten thousand gauss to vary the operating frequency over a range of the order of thirty megacycles per second from the zero field frequency.

What is claimed is:

1. An electrical arrangement comprising, a material capable of exhibiting nuclear quadrupole resonance, means for utilizing the internal quadrupole couplings of said material for translating the internal energies of the atoms or molecules of said material into electromagnetic radiation energy, and means for coupling to said radiation energy.

2. An electrical arrangement comprising, a non-magnetic material which exhibits a plurality of discrete energy levels as a result of a nuclear quadrupole interaction, means responsive to said quadrupole interaction for inducing energy level transitions between certain ones of said energy levels whereby electromagnetic radiation energy is produced, and means for coupling to said radiation energy.

3. An electrical arrangement comprising, a non-magnetic material which possesses nuclei with quadrupole moments present in a lattice site which has a gradient of electric field produced by crystalline or molecular fields, means for utilizing the internal couplings between said nuclei and said electric field gradient for translating the internal energies of said atoms or molecules into electromagnetic radiation energy, and means for coupling to said radiation energy.

4. An electrical arrangement comprising, a non-magnetic material which as a result of a nuclear quadrupole interaction exhibits at least three discrete energy levels, means for applying a radio-frequency field to said material at a frequency determined by two of said energy levels to induce transitions between said energy levels in response to said quadrupole interactions, and means for deriving electro-magnetic radiation energy from said material at a frequency determined by one of said two energy levels and the remaining one of said three energy levels.

5. An electrical arrangement comprising, a solid non-magnetic material which as a result of a nuclear quadrupole interaction exhibits at least three discrete energy levels, means for applying a radio-frequency field to said material at a frequency determined by two of said energy levels to induce transitions between said energy levels in response to said quadrupole interactions, and means for deriving electromagnetic radiation energy from said material at a frequency determined by one of said two energy levels and the remaining one of said three energy levels.

6. An arrangement as claimed in claim 5 further including cooling means for low temperature operation of said arrangement.

7. An electrical arrangement comprising, a hollow wave energy structure containing a non-magnetic material which as a result of a nuclear quadrupole interaction exhibits at least three discrete energy levels, connection means to said hollow wave energy structure for applying a radio-frequency field to said material at a frequency determined by two of said energy levels to induce transitions between said energy levels in response to said quadrupole interactions, and additional connection means to said hollow wave energy structure for deriving electromagnetic wave energy from said material at a frequency determined by one of said two energy levels and the remaining one of said three energy levels.

8. An electrical arrangement comprising, a cavity resonator containing a non-magnetic material which as a result of a nuclear quadrupole interaction exhibits at least three discrete energy levels, connection means to said cavity resonator for applying a radio-frequency field to said material at a frequency determined by two of said energy levels to induce transitions between said energy levels in response to said quadrupole interactions, and additional connection means to said cavity resonator for deriving electro-magnetic wave energy from said material at a frequency determined by one of said two energy levels and the remaining one of said three energy levels.

9. A microwave amplifier as claimed in claim 8 wherein said cavity resonator is of the coaxial type.

10. An electrical arrangement comprising, a non-magnetic material which as a result of a nuclear quadrupole interaction exhibits at least three discrete energy levels $W_1$, $W_2$, and $W_3$, where normally the number of atoms or molecules of said material in energy level $W_1$ is greater than the number of atoms or molecules of said material in energy level $W_2$ and the number of atoms or molecules of said material in energy level $W_2$ is greater than the number of atoms or molecules of said material in energy level $W_3$, means for applying a radio-frequency field to said material at a frequency determined by the difference between energy levels $W_1$ and $W_3$ to induce transitions between said energy levels in response to said quadrupole interactions, and means for deriving electromagnetic radiation energy from said material at a frequency determined by the difference between energy levels $W_1$ and $W_2$ or by the difference between energy levels $W_2$ and $W_3$.

11. A microwave arrangement as claimed in claim 10 including means for applying a magnetic field to said material to control the separation of said energy levels.

12. An electrical arrangement comprising, a non-magnetic material which as a result of a nuclear quadrupole interaction exhibits at least three discrete energy levels $W_1$, $W_2$, and $W_3$, where normally the number of atoms or molecules of said material in energy level $W_1$ is greater than the number of atoms or molecules of said material in energy level $W_2$ and the number of atoms or molecules of said material in energy level $W_2$ is greater than the number of atoms or molecules of said material in energy level $W_3$, means for applying a radio-frequency field to said material to equalize the numbers of atoms or molecules in energy levels $W_1$ and $W_3$ to induce transitions between said energy levels in response to said quadrupole interactions, and means for deriving electromagnetic radiation energy from said material at a frequency determined by the difference between energy levels $W_1$ and $W_2$ or by the difference between energy levels $W_2$ and $W_3$.

13. An electrical arrangement comprising, a non-magnetic material which as a result of a nuclear quadrupole interaction exhibits at least three discrete energy levels, a cavity resonator within which said material is contained, said resonator being resonant at a first frequency determined by two of said energy levels and also resonant at a second frequency determined by one of said two energy levels and the remaining one of said three energy levels, connection means to said cavity resonator for applying a radio-frequency field to said material at said first frequency to induce transitions between said energy levels in response to said quadrupole interactions to excite atoms or molecules of said material, and additional connection means to said cavity resonator for deriving from said excited atoms or molecules electromagnetic radiation energy at said second frequency.

14. An electrical arrangement comprising, a non-magnetic material which as a result of a nuclear quadrupole interaction exhibits at least three discrete energy levels $W_1$, $W_2$, and $W_3$, where normally the number of atoms or molecules of said material in energy level $W_1$ is greater than the number of atoms or molecules in energy level $W_2$ and the number of atoms or molecules of said material in energy level $W_2$ is greater than the number of atoms or molecules of said material in energy level $W_3$, a cavity resonator within which said material is contained, said cavity resonator being resonant at a first frequency determined by the difference between energy levels $W_1$ and $W_3$ and also resonant at a second frequency determined by the difference between energy levels $W_1$ and $W_2$, connection means to said cavity resonator for applying a radio-frequency field at said first frequency to induce transitions between said energy levels in response to said quadrupole interactions to excite atoms or molecules of said material, and additional connection means to said resonator for deriving from said excited atoms or molecules electromagnetic radiation energy at said second frequency.

15. An electrical arrangement comprising, a non-magnetic material which as a result of a nuclear quadrupole interaction exhibits at least three discrete energy levels $W_1$, $W_2$, and $W_3$, where normally the number of atoms or molecules of said material in energy level $W_1$ is greater than the number of atoms or molecules in energy level $W_2$ and the number of atoms or molecules of said material in energy level $W_2$ is greater than the number of atoms or molecules of said material in energy level $W_3$, a cavity resonator within which said material is contained, said cavity resonator being resonant at a first frequency determined by the difference between energy levels $W_1$ and $W_3$ and also resonant at a second frequency determined by the difference between energy levels $W_2$ and $W_3$, connection means to said cavity resonator for applying a radio-frequency field at said first frequency to induce transitions between said energy levels in response to said quadrupole interactions to excite atoms or molecules of said material, and additional connection means to said resonator for deriving from said excited atoms or molecules electromagnetic radiation energy at said second frequency.

16. An amplifier comprising, a non-magnetic material which as a result of a nuclear quadrupole interaction exhibits at least three discrete energy levels, means for applying a radio-frequency field to said material at a frequency determined by two of said energy levels to induce transitions between said energy levels in response to said quadrupole interactions to excite said material for the amplification of electrical energy, and means for applying input electrical energy to said excited material and deriving from said material amplified input energy at a frequency determined by one of said two energy levels and the remaining one of said three energy levels.

17. A microwave amplifier comprising, a non-magnetic material which as a result of a nuclear quadrupole interaction exhibits at least three discrete energy levels, a cavity resonator within which said material is contained, said resonator being resonant at a first frequency determined by two of said energy levels and also resonant at a second frequency determined by one of said two energy levels and the remaining one of said three energy levels, connection means to said cavity resonator for applying a radio-frequency field to said material at said first frequency to induce transitions between said energy levels in response to said quadrupole interactions to excite said material for the amplification of electrical energy, and additional connection means to said cavity resonator for applying input electrical energy to said excited material and deriving from said material amplified input energy at said second frequency.

18. A microwave amplifier comprising, a non-magnetic material which as a result of a nuclear quadrupole interaction exhibits at least three discrete energy levels $W_1$, $W_2$, and $W_3$, where normally the number of atoms or molecules of said material in energy level $W_1$ is greater than the number of atoms or molecules of said material in energy level $W_2$ and the number of atoms or molecules of said material in energy level $W_2$ is greater than the number of atoms or molecules of said material in energy level $W_3$, a cavity resonator within which said material is contained, said cavity resonator being resonant at a first frequency determined by the difference between energy levels $W_1$ and $W_3$ and also resonant at a second frequency determined by the difference between energy levels $W_1$ and $W_2$ or $W_2$ and $W_3$, connection means to said cavity resonator for applying a radio-frequency field to said material at said first frequency to induce transitions between said energy levels in response to said quadrupole interactions to excite said material for the amplification of electrical energy, and additional connection means to said cavity resonator for applying input electrical energy to said excited material and deriving amplified input energy at said second frequency.

19. A microwave generator comprising, a non-magnetic material which as a result of a nuclear quadrupole interaction exhibits at least three discrete energy levels, means for applying a radio-frequency field to said material at a frequency determined by two of said energy levels to induce transitions between said energy levels in response to said quadrupole interactions, and means for deriving phase coherent electromagnetic radiation energy from said material at a frequency determined by one of said two energy levels and the remaining one of said three energy levels.

20. A microwave generator comprising, a non-magnetic material which as a result of a nuclear quadrupole interaction exhibits at least three discrete energy levels $W_1$, $W_2$, and $W_3$, where normally the number of atoms or molecules of said material in energy level $W_1$ is greater than the number of atoms or molecules of said material in energy level $W_2$ and the number of atoms or molecules of said material in energy level $W_2$ is greater than the number of atoms or molecules of said material in energy level $W_3$, a cavity resonator within which said material is contained, said cavity resonator being resonant at a first frequency determined by the difference between the energy levels $W_1$ and $W_3$ and also resonant at a second frequency determined by the difference between energy levels $W_1$ and $W_2$ or $W_2$ and $W_3$, connection means to said cavity resonator for applying a radio-frequency field to said material at said first frequency to induce transitions between said energy levels in response to said quadrupole interactions, and means for deriving phase coherent electromagnetic radiation energy from said material at said second frequency.

References Cited in the file of this patent

UNITED STATES PATENTS

| | | |
|---|---|---|
| 2,589,494 | Hershberger | Mar. 18, 1952 |
| 2,714,663 | Norton | Aug. 2, 1955 |
| 2,793,360 | Beaumont | May 21, 1957 |
| 2,909,654 | Bloembergen | Oct. 20, 1959 |

FOREIGN PATENTS

| | | |
|---|---|---|
| 678,383 | Great Britain | Sept. 3, 1952 |

(Other references on following page)

OTHER REFERENCES

Introduction to Solid State Physics by C. Kittle, published by John Wiley & Sons, Inc., N.Y., second edition, copyright 1956, pages 229–230.

Pub. I, Possible Methods of Obtaining Active Molecules for a Molecular Oscillator by Basov and Prokhorov, Soviet Physics JETP, vol. 1, No. 1, July 1955, pp. 184–185.

Pub. II, Proposal for a New Type Solid State Maser by Bloembergen, Physical Review, vol. 104, No. 2, Oct. 15, 1956, pp. 324 to 327.

Pub. III, Operation of a Solid State Maser by Scovil, Feher and Seidel, Physical Review, January 1957, vol. 105, No. 2, pp. 762–763.

Article: Proceedings of French Academy of Sciences, Sept. 1, 1956, 1st semester, vol. 242, No. 20, pp. 2451–2453.

Article by J. Weber, "Amplification of Microwave Radiation by Substances Not in Thermal Equilibrium," Transactions of IRE, June 1953.

"Molecular Theory of Gases and Liquids," by Hirschfelder, Curtis and Bird, published by John Wiley and Sons, N.Y., 1954.

"Theoretical Nuclear Physics," by Blatt and Weiskoff; published by John Wiley and Sons, New York, N.Y., 1952.